US012717808B2

(12) United States Patent
Puravankara et al.

(10) Patent No.: US 12,717,808 B2
(45) Date of Patent: Aug. 25, 2026

(54) DATA MANAGEMENT IN A MULTI-TENANT ENVIRONMENT

(71) Applicant: Honeywell International Inc., Charlotte, NC (US)

(72) Inventors: Hariprasad Puravankara, Hoschton, GA (US); Senthil Unnikrishnan, Atlanta, GA (US); Rahul Kaushal, Kurukshetra (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/915,583

(22) Filed: Oct. 15, 2024

(65) Prior Publication Data

US 2026/0105059 A1 Apr. 16, 2026

(51) Int. Cl.
*G06F 16/25* (2019.01)

(52) U.S. Cl.
CPC .................................. *G06F 16/258* (2019.01)

(58) Field of Classification Search
CPC ............................ G06F 16/214; G06F 16/258
See application file for complete search history.

(56) References Cited

U.S. PATENT DOCUMENTS

2011/0258179 A1* 10/2011 Weissman ......... G06F 16/24537 707/713
2014/0130056 A1* 5/2014 Goodman ............. G06F 9/5044 718/104
2020/0183916 A1* 6/2020 Shultis ................... G16H 10/60
2022/0121636 A1* 4/2022 Zheng ................... G06F 40/284
2025/0355905 A1* 11/2025 Brenner ................ G06F 16/338

OTHER PUBLICATIONS

Database Design—in multi-tenant systems what is the correct practice for segregating each tenants data from each other, webpage, https://softwareengineering.stackexchange.com/questions/231165/in-multi-tenant-systems-what-is-the-correct-practice-for-segregating-each-tenant, Mar. 4, 2014, 3 pages.
Pinecone Systems, Inc., Multi-Tenancy in Vector Databases, webpage, https://www.pinecone.io/learn/series/vector-databases-in-production-for-busy-engineers/vector-database-multi-tenancy/, Jun. 18, 2024, 7 pages.
Florin Coros, Data Isolation and Sharing in a Multitenant System—Part 1, webpage, https://oncodedesign.com/data-isolation-and-sharing-in-multitenant-system-part1/, Jan. 25, 2017, 12 pages.

* cited by examiner

*Primary Examiner* — Cheyne D Ly
(74) *Attorney, Agent, or Firm* — Alston & Bird LLP

(57) ABSTRACT

Devices, methods, and systems for data management in a multi-tenant environment are described herein. One method includes receiving a request for data associated with one of a plurality of tenants, and input parameters corresponding to the request, retrieving source data compiled from the plurality of tenants, wherein the compiled source data includes a plurality of data types, constructing filters to split data of a vector data type among the plurality of data types based on the received request and input parameters, splitting the compiled source data into the vector data type using the constructed filters, generating the requested data from the split data, and transmitting the generated requested data to a target database of the one of the plurality of tenants.

20 Claims, 6 Drawing Sheets

DATA MANAGEMENT IN A MULTI-TENANT ENVIRONMENT

TECHNICAL FIELD

The present disclosure relates generally to devices, methods, and systems for data management in a multi-tenant environment.

BACKGROUND

A multi-tenant environment can store data for multiple tenants (e.g., customers) in a database with each tenant's data isolated via different schemas. Data management in such multi-tenant environments is often addressed at the database or schema level, which can introduce scalability and security issues when implemented across different vendors or customers.

DETAILED DESCRIPTION

Figure 1:
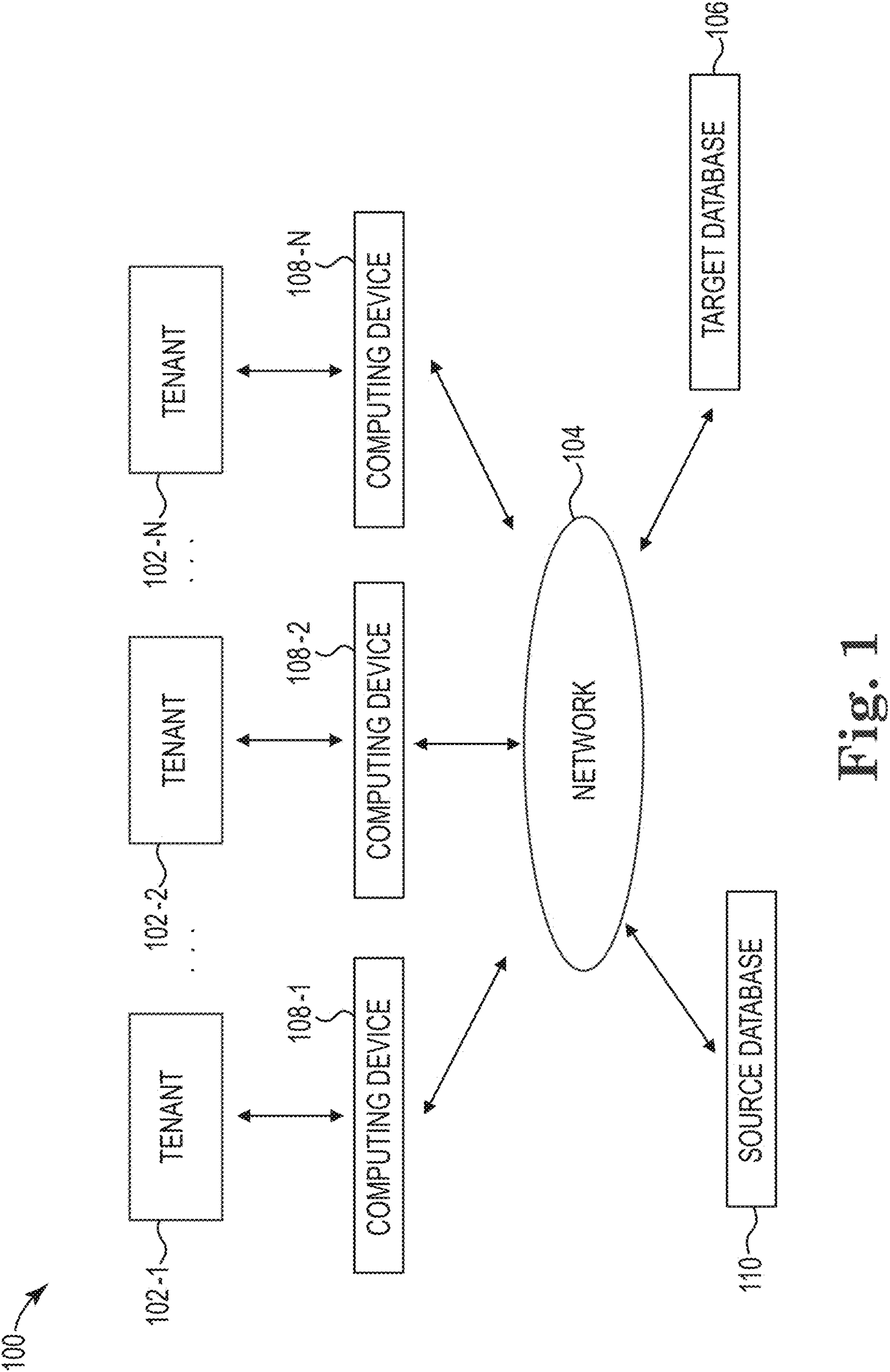
FIG. 1 illustrates a block diagram of an example of a system for data management in a multi-tenant environment in accordance with one or more embodiments.

Devices, methods, and systems for data management in a multi-tenant environment are described herein. One method includes receiving a request for data associated with one of a plurality of tenants, and input parameters corresponding to the request, retrieving source data compiled from the plurality of tenants, wherein the compiled source data includes a plurality of data types, constructing filters to split data of a vector data type among the plurality of data types based on the received request and input parameters, splitting the compiled source data into the vector data type using the constructed filters, generating the requested data from the split data, and transmitting the generated requested data to a target database of the one of the plurality of tenants.

The present disclosure improves data management across multiple tenants by implementing vector data splitting to manage resources at the data level, instead of at the database or schema level. Vector data can be dynamically assigned to tenants based on specific parameters, and split across multiple tenants to ensure data isolation and efficient use of resources. Custom tags can be used to facilitate the segregation of data at a customer, product, or any custom field level to provide migration of vector data to multiple tenants. Further, the data management method can be used for data transfers within the same environment, between different environments, or across different tenants by appending vectors and utilizing combinations of custom filters.

As an example, a master database can store data for multiple tenants, from which the data can be transmitted to the respective tenants. The data can be stored in both standard tables and as vectorized data. Data stored in standard tables can be filtered based on fields and transmitted to customer tenants accordingly. However, filtering vectorized data, which includes collection and embeddings of the data, is accomplished using custom tags within the data fields. This methodology allows vectorized data to be segregated across multiple tenants by utilizing multiple combinations of filters ensuring data isolation and performance improvement.

Embodiments of the present disclosure transfer data from a source database (e.g., the master database of the multi-tenant environment) to a target database of one of the tenants upon receiving a request for the data from the tenant. The process begins with defining a mapping between different data types (e.g., Spark data types and PostgreSQL data types) stored in the source database, as the data in the source database may be a different data type than the data in the target database. Additional data type checks can be implemented at this stage to accommodate any special case data types (e.g., uuid, public.vector, and JSON filtering).

Filters to split data of a vector data type among the different data types are constructed according to parameters input by a user to specify which rows of source data are to be transferred to the target database based on certain conditions. The data from the source database can be split into the vector data type using the constructed filters, and the requested data can be generated from the split data and transmitted to the target database.

Transmitting the requested source data to the target database can include reading the data from the source database, writing it to a temporary location in the target database, and then transferring (e.g., migrating) it to its final location in the target database. The data can be inserted into a target table in the target database by creating or altering the necessary columns in the target table and then inserting the data. Once the requested source data has been transmitted to the target database, a message indicating that the data transmission has occurred can be generated and transmitted.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designator "N", as used herein, particularly with respect to reference numerals in the drawings, indicates that a number of the particular feature so designated can be included with a number of embodiments of the present disclosure.

FIG. 1 illustrates a block diagram of an example of a system 100 for data management in a multi-tenant environment in accordance with one or more embodiments. The system 100 can include a plurality of tenants 102-1, 102-2, . . . , 102-N (which may be collectively referred to herein as tenants 102), a plurality of computing devices 108-1, 108-2, . . . , 108-N (which may be collectively referred to herein as computing devices 108), and a network 104. As used herein, a tenant may refer to a customer, vendor, client, user, individual, or group that stores associated data within a shared database or otherwise occupies a portion of a shared database. For example, a tenant may refer to a customer who has purchased a product from a seller. Data and information corresponding to the purchase (e.g., details about the product(s), customer information, safety manuals associated with the product, etc.) may be stored in a shared database managed by the seller.

The shared database that stores data associated with each tenant may be referred to as a source database 110. Each tenant of the plurality of tenants 102 may access data stored in the source database via a request sent through a network 104. As used herein, the network may be part of a cloud computing infrastructure or environment.

Network 104 can be a network relationship through which the source database 110, target database 106, and computing devices 108 can communicate. Examples of such a network relationship can include a distributed computing environment (e.g., a cloud computing environment), a wide area network (WAN) such as the Internet or a LoRaWAN, a local area network (LAN), a personal area network (PAN), a campus area network (CAN), or metropolitan area network (MAN), among other types of network relationships. For instance, network 104 can include a number of servers that receive information from, and transmit information to, computing devices 108, source database 110, and target database 106 via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users (e.g., tenants) may interact with network-enabled software applications to make a network request, such as to get a file or print on a network printer. Applications may also communicate with network management software, which can interact with network hardware to transmit information between devices on the network.

As illustrated in FIG. 1, the system 100 further includes a source database 110. The source database 110 can be, for example, a PostgreSQL database. The source database 110 can include (e.g., be a collection of) data associated with the plurality of tenants 102 described herein.

Each tenant of the plurality of tenants 102 may submit a request for data (e.g., in the form of a query submission) via a computing device 108. As illustrated in the example of FIG. 1, tenant 102-1 may request data associated with tenant 102-1 (e.g., access the source database) via computing device 108-1, tenant 102-2 may request data associated with tenant 102-2 (e.g., access the source database) via computing device 108-2, etc. The request for data (e.g., query submission) may be received at the computing device 108 via an input (e.g., keyboard, touchscreen, etc.). The computing device 108 may process the request for data locally at the computing device or may transfer the request to the network 104 for further processing.

The request for data may include a plurality of input parameters corresponding to the request. For example, the input parameters may further define the data requested. The input parameters may further define a type of data requested, a format in which the requested data is to be received (e.g., displayed), or identify key insights to be included in the retrieval of the requested data. The request for data may also include more than one request. For example, the request for data may include more than one query submission or there may be more than one request received in the same query submission.

The requested data may be retrieved from the source database 110 and provided to the tenant that requested the data via a computing device 108. For example, if tenant 102-1 submits a request for data via computing device 108-1, then the requested data may be provided to tenant 102-1 via a display of computing device 108-1.

In another embodiment, the requested data may be provided to a target database 106 in response to a request for data via a computing device 108. For example, tenant 102-2 may submit a request for data via computing device 108-2 and the requested data may be transmitted to a target database 106 associated with tenant 102-2. Alternatively, tenant 102-2 may have access to a corresponding portion of a target database 106 and may access the requested data via the network 104. The target database may be a singular database (as illustrated in FIG. 1) that each tenant of the plurality of tenants 102 may access or, alternatively, each tenant of the plurality of tenants 102 may have their own target database that is not accessible by other tenants of the plurality of tenants 102.

Figure 2:
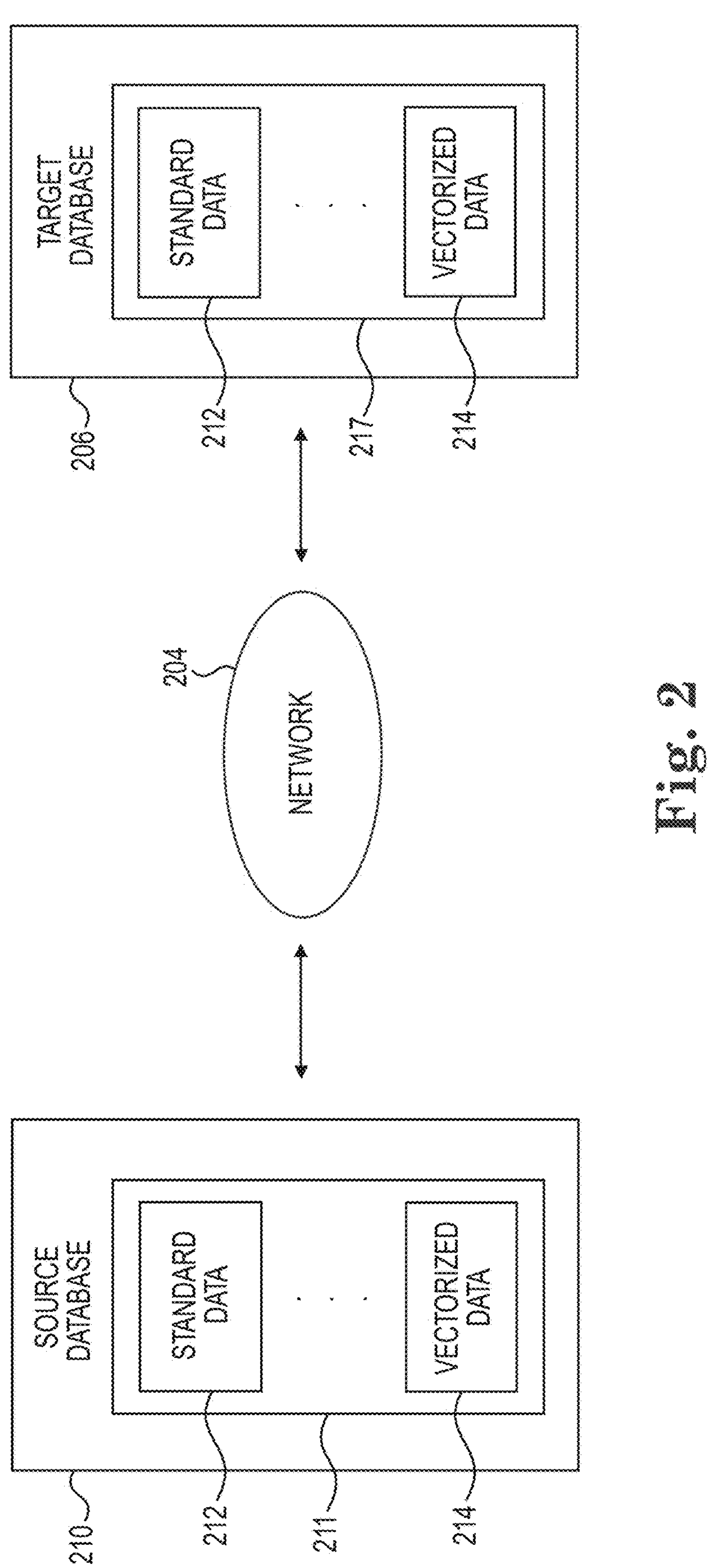
FIG. 2 illustrates a block diagram of an example of a system for data management in a multi-tenant environment in accordance with one or more embodiments.

FIG. 2 illustrates a block diagram of an example of a system for data management in a multi-tenant environment in accordance with one or more embodiments. As shown in FIG. 2, the system can include a source database 210, network 204, and target database 216, which may be the same source database, network, and target database, respectively, previously described in connection with FIG. 1.

As previously mentioned in connection with FIG. 1, a request for data stored in the source database 210 may be received via a network 204. The requested data may be retrieved from the source database 210 and may then be transmitted to a target database 206 via network 204, in some embodiments.

The source database 210 can be, for example, a PostgreSQL database. The source database 210 can include (e.g., be a collection of) data associated with the plurality of tenants, as described in connection with FIG. 1. For example, the data stored within the source database 210 may be Postgres data. Postgres data, as used herein, refers to the data managed, stored, and processed within a PostgreSQL database. Within the source database 210, the data may be organized and arranged according to different schemas. Schemas, as used herein, refer to a method of logically grouping objects within a database to provide structure and organization. Each tenant's data may be isolated via different schemas within the source database 210.

Source data 211 is data stored within the source database 210. Source data 211 can include (e.g., the source database 210 can accommodate) both standard data 212 and vectorized data 214. For instance, source data 211 includes data of the standard data type 212 and vectorized data type 214. Standard data 212 and vectorized data 214 may each be referred to as source data 211 on their own or collectively as a whole when stored, retrieved, or processed in the source database 210. Standard data, as used herein, refers to data organized in a standard data table arranged in rows and columns. The rows within the standard data table represent individual data entries, while the columns represent the attributes or fields of the data. Data within a column of a standard data table is typically of the same data type. Vectorized data, as used herein, refers to data represented in the form of vectors (e.g., arrays or lists of numbers). Vectorization of data, or the process of transforming data to a numeric form, allows for data operations to be performed on entire arrays simultaneously.

Vectorized data 214 as found in the source database 210 can include data of the PGVector datatype. PGVector data includes fields such as "embedding" of the "public.vector" datatype, for example. Embedding, as used herein, is a tool used to transform data into a vector of continuous values, which can then be used as an input for machine learning models, for example. Vectorized data can encompass collections and embeddings of PGVector data. Collections of data, as used herein, refers to any organized group or set of data stored within a database, such as the source database 210 or target database 206, for example.

As previously described, data associated with a plurality of tenants (e.g., tenants 102 previously described in connection with FIG. 1) is stored in the source database 210. From this source database 210, data is disseminated (e.g., transmitted, transferred, etc.) to the tenants upon receiving a request for data. For standard data 212, filtering and disseminating the data is performed based on data fields. Fields are individual units of data representing a specific attribute or characteristic of the data. For example, in a standard data table, the field corresponds to the columns in the data table. However, for vector data 214, a distinct approach is used for segregating data across multiple tenants by assigning custom tags to the vector data (e.g., within the "cmetadata" field). This method facilitates data segregation at the customer, product, or any custom field level within the source database 210, as will be described further in connection with FIG. 3.

When the request for data is received at the network 204, the requested data is retrieved from the source database 210. The requested data may be in the form of standard data 212 or vectorized data 214, or both. A method of segregating the requested data is performed, and the requested data is transmitted to the target database 206 via the network 204.

The requested data may be transmitted in the standard data type format, the vectorized data type format, or both. When the requested data is received at the target database, it is disseminated and arranged according to its data type. For example, if the requested data is received in the form of the standard data type, it will be organized as standard data 212 in a standard data table of the target database 206. As another example, if the requested data is received in the form of the vectorized data type, it will be arranged as vectorized data 214 in a vectorized database table of the target database 206. Embodiments of the present disclosure are not limited to a specific data type and other data types may be utilized.

The target database stores target data 217. Target data 217 can include data 212 of the standard data type and data 214 of the vectorized data type. The standard data 212 and vectorized data 214 can each be referred to as target data 217 on their own or collectively when stored, retrieved, or processed in the target database 206.

In the example illustrated in FIG. 2, a single target database 206 is depicted. Alternatively, more than one target database may be utilized. Each tenant of the plurality of tenants may have access to the same target database, as illustrated in FIG. 2, or each tenant may have access to their own target database. In either case, the method of data segregation is performed in a similar manner.

In the example illustrated in FIG. 2, a single portion of the source database 210 and a single portion of the target database 206 is dedicated to standard data 212. Additionally, a single portion of the source database 210 and a single portion of the target database 206 is dedicated to vectorized data 214. Alternatively, more than one portion of the source database 210, target database 206, or both may be dedicated to standard data and/or vectorized data 214.

The network 204 of FIG. 2 may be the same network as described in connection with FIG. 1. The network 204 can be a network relationship through which the source database 210 and target database 206 can communicate. For instance, network 204 can include a number of servers that receive information from, and transmit information to the source database 210 and/or the target database 206 via a wired or wireless network.

Figure 3:
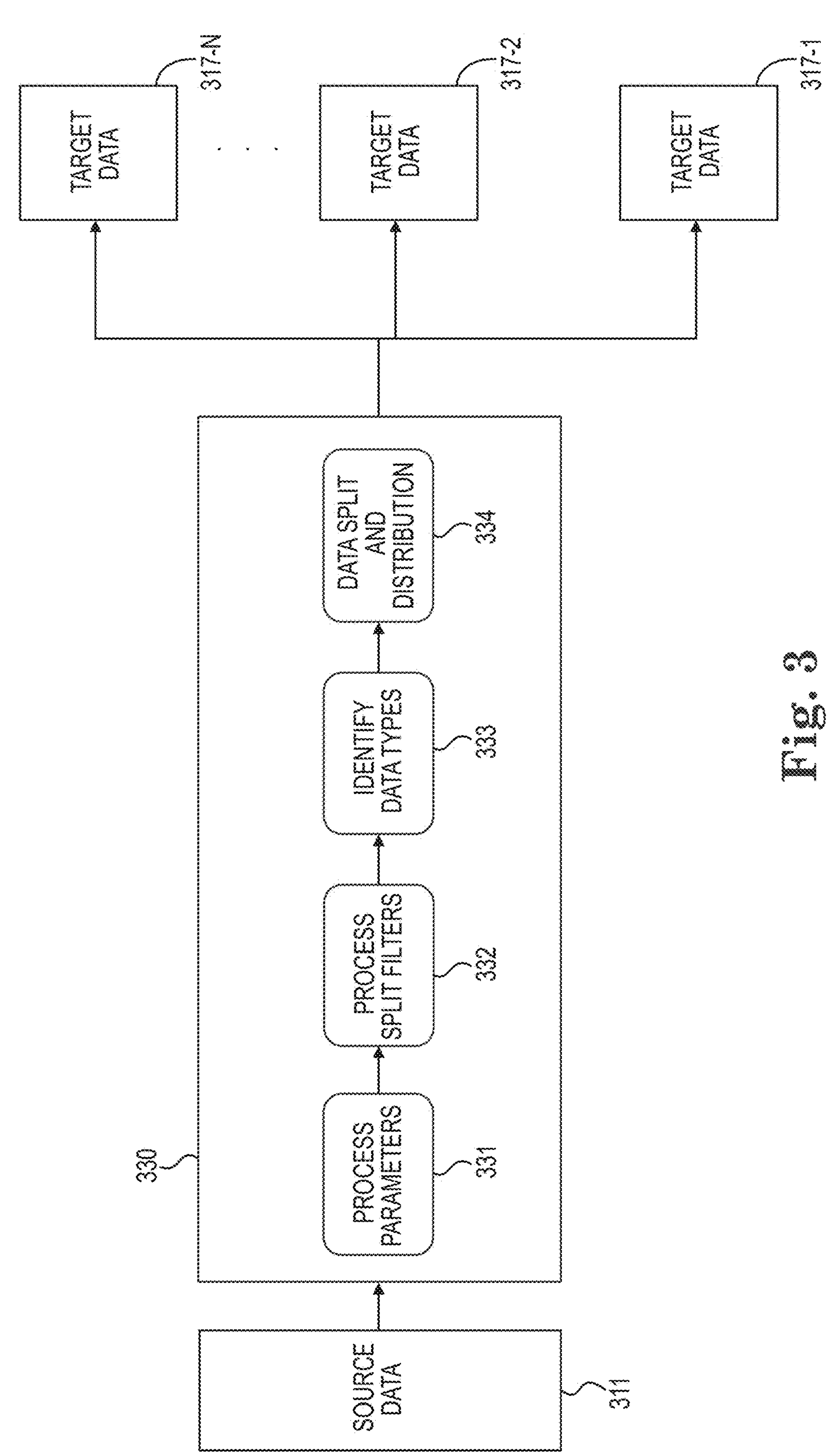
FIG. 3 illustrates a flow diagram of a method of data management in a multi-tenant environment in accordance with one or more embodiments.

FIG. 3 illustrates a flow diagram of a method 330 of data management in a multi-tenant environment in accordance with one or more embodiments. The method depicted in FIG. 3 can be implemented in a cloud computing environment, as described in connection with FIG. 2. For instance, the method 330 of FIG. 3 may be implemented by an application installed on a computing device of the cloud computing environment. The application may be a generative artificial intelligence application that utilizes inputs from a user to generate results.

The method receives source data 311. The source data 311 may be the same source data as described in connection with FIG. 2. The source data 311 can include both vectorized data and normal (e.g., standard) table data. The source data 311 can also include filter details corresponding to the source data 311. The filter details can include fields, custom attributes, or vector split attributes associated with the source data 311.

As illustrated in the embodiment of FIG. 3, source data 311 is transferred from a source database to a target database by method 330. The method 330 begins with processing input parameters 331. The input parameters 331 may correspond to parameters included in the initial query submission by a user, as described with reference to FIG. 1. The query submission may include details describing a type of data requested, a target location to transfer the requested data, or details describing the source data. The details included in the query submission may be included in the input parameters. In an alternative embodiment, the query submission may only include general information with little to no details describing the data of interest. As an example, the initial query submission may be an inquiry about a problem or defect with an item a user has purchased. The query may include the name of the product and the related customer information (e.g., user's name, user's address, date ordered). The method of data management described is able to handle both types of queries to determine the correct source data to transfer to the target database.

The method 330 may determine the appropriate source data 311 based on the input parameters received with the initial query submission. The method may process the determined source data 311 and details corresponding to the target database as the input parameters are received with the query submission by the user's computing device. A mapping between data of different data types is defined. For example, mapping between Spark data types and Postgres data types is defined. Data type mapping is performed so that data of one data type from the source database can be mapped to data of another data type in the target database. Additionally, data type mapping allows data of one data type stored in the source database to be converted to data of another data type before storing the data in the target database.

Additional data type checks are performed to process additional vector data types, such as Postgres vector data types, for example. The additional data type check functionality determines if the field name of the data in interest (either source data or target data) matches any of the data types determined to be a special case and returns the corresponding data type. Data included in the special case category may be predefined by a user, defined during the method 330 based on an analysis of the data included in the method 330 of data splitting, or defined by a user in some cases.

The method 330 may continue with processing of split filters 332. When the input parameters are received, the computing device or network may intelligently construct split filters corresponding to the input parameters. The method 330 includes a function to construct a filter string for the query submission. This allows a user to specify which rows of data in the source database are to be transferred to the target database based on certain conditions (e.g., input parameters) set by the tenant.

The source data is split and distributed according to intelligently constructed filters. The processing of the split filters 332 can include normal and complex filters. This process may automatically map JavaScript Object Notation (e.g., JSON) filters for vector data splits, as an example.

The method 330 may proceed to identify data types 333 present in the identified requested data. The data types present may include a number of different data types, such as normal table data or vectorized data. The data types identified may also be of the same data type. Identifying data types 333 may also include identifying data types present in the target database of which the requested data is to be transferred.

When the data types present in the requested data are identified, the method proceeds to splitting the source data and distributing it to the appropriate target database 334. The source data determined to be included in the requested data based on the received input parameters is first copied so that a separate copy of the requested source data can be transmitted to the target database while the original copy of source data can remain stored in the source database. The source data is read directly from the source database. Once a copy of the requested source data is produced, the constructed split filters can be applied to the requested source data. The split filters can be applied to separate the data determined to be included in the requested data of one tenant from source data associated with data of another tenant that is stored in the source database.

When the split filters are applied to the requested source data, the resulting split data can then be migrated to the appropriate corresponding target database. Transferring data from the source database to the target database includes reading data from the source database, writing it to a temporary location in the target database, and then moving the requested data to its final location in the target database. The requested data can be inserted directly into a data table of the target database. This process can include creating or altering the necessary columns in the target data table and then inserting the data.

When the method 330 is complete and the requested data has been split according to the constructed filters, the data may be distributed as target data 317. The method may produce more than one target data based on the submitted query and input parameters. As such, the target data may include a plurality of target data including a number of target data 317-1, 317-2, 317-N. The target data may be distributed and stored in the same target database, or may be distributed to an individual target database accessible by a tenant. The target data 317 may be distributed to the same target database. The target data 317 may also be distributed to separate target databases in an alternative embodiment.

The target data 317 may be of the normal data type, vector data type, or both. In other words, the target data may be of the same data type or comprise more than one data types. The target data of one data type may be stored in one location of the target database, while target data of another data type may be stored in a separate location of the target database.

In some embodiments, the method 330 may include loading test data using the parameters and constructed filters determined, and executing the method using the test data to determine if the result is accurate based on the query submitted. Test configuration options may be set based on the received input parameters. If the test data produces the desired result (e.g., the data is split accurately and/or no errors are received), then the data transfer function may be activated to perform the actual data split and distribution 334. When the data transfer is complete, a message may be generated and transmitted. For example, the message can be transmitted to the console of the computing device performing the method 330. In some examples, the computing device performing the method may be separate from the computing device that received the initial query submission with the request for data. A message may be generated and transmitted to both computing devices, or may only be transmitted to one computing device.

Figure 4:
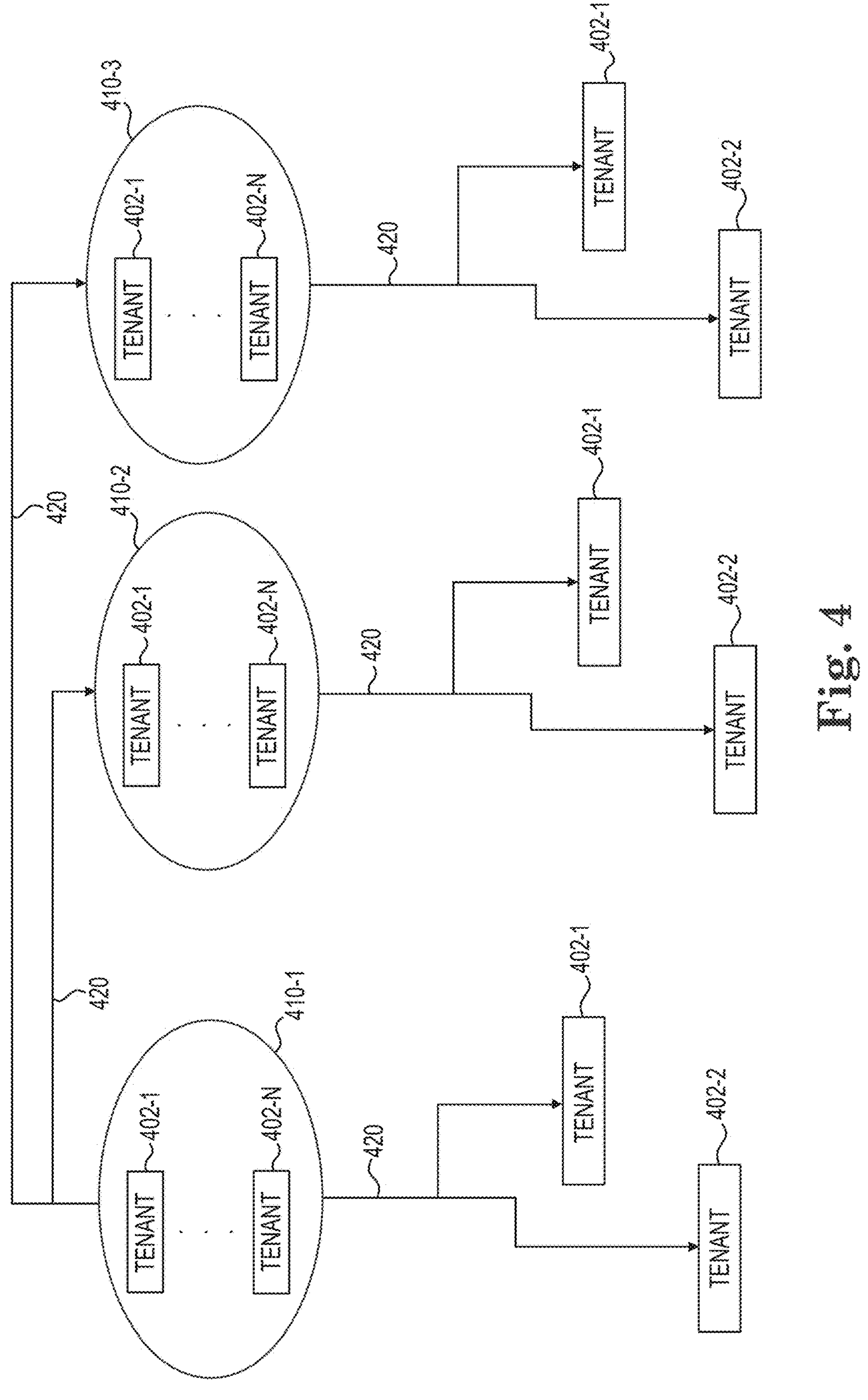
FIG. 4 illustrates a flow diagram of a method of data management in a multi-tenant environment in accordance with one or more embodiments.

FIG. 4 illustrates a flow diagram of a method of data management in a multi-tenant environment in accordance with one or more embodiments. The method illustrated in FIG. 4 may be performed in the cloud computing environment described in connection with FIG. 1, for example. The method of FIG. 4 may utilize some or all of the steps of method 330 described in connection with FIG. 3.

Data may be transferred in a multi-tenant environment in a horizontal direction or a vertical direction, as illustrated in FIG. 4. A request for data may be received by a computing device and/or a network. The request for data can include input parameters describing details of the requested data to help identify the requested data among source data. The source data can be compiled from a plurality of tenants within a computing environment. The compiled source data can be stored (e.g., housed) in a plurality of source databases 410-1, 410-2, . . . , 410-N, which can be collectively referred to as source databases 410, such that data from each tenant among the plurality of tenants 402-1, . . . , 402-N is stored among data from other tenants among the plurality of tenants.

When the request for data is received, source data corresponding to the request is identified among the compiled source data. The requested data is then split according to generated split filters, as described previously in relation to FIG. 3. The requested data 420 is migrated from the source database 410 to the appropriate target database. The requested data results from one data split process may be transferred directly from the source database 410 to the tenant 402 (e.g., customer). This process may be repeated for another tenant upon submission of a request for data.

For example, tenant 402-1 may submit a request for data from the source database 410-1. The requested data 420 may be migrated from the source database 410-1 to a target database of tenant 402-1. Tenant 402-2 may submit a separate request for data from the source database 410-1. The request from tenant 402-2 may be submitted concurrently with the request from tenant 402-1. The data requests can be processed concurrently. The requested data 420 may be migrated to a target database of tenant 402-2. The data migration may occur simultaneously from the source database 410-1 to tenant 402-1 and tenant 402-2.

The requested data 420 transferred to the tenant 402 can include data of more than one data type. The requested data can also include any collections or embeddings associated with the requested source data.

The requested data may be distributed from one source database to another source database. For example, the requested data may be transmitted from a first, smaller source database 410-1 to a second, larger source database 410-2. The second, larger source database 410-2 may have a larger enrollment (e.g., more tenants) than the first, smaller source database 410-1. The second, larger source database 410-2 may include the same source data from a plurality of tenants as the first, smaller source database 410-1 but may include additional source data from at least one tenant not included in the first, smaller database 410-1. In this example, the request for data may originate from the second, larger source database 410-2 and request data from the first, smaller source database 410-1. The requested data may utilize the same data split and distribution methodology described in relation to FIG. 3.

Alternatively, the first database 410-1 and the second database 410-2 may be the same size but include source data from at least one of the same tenants from the plurality of tenants. For instance, the first source database 410-1 and the second source database 410-2 may include one shared tenant among a plurality of tenants.

A request for data may be received at the second source database 410-2 directly from a tenant storing data in the second source database. The process of splitting and distributing the requested data from the second source database 410-2 is similar to the process and methodology described in FIG. 3. The request for data may be received by a computing device of a tenant among the plurality of tenants. The data request may be processed and distributed to the tenant that submitted the initial data request.

For example, tenant 402-1 may submit a request for data from the source database 410-2. The requested data 420 may be migrated from the source database 410-2 to a target database of tenant 402-1. Tenant 402-2 may submit a separate request for data from the source database 410-2. The request from tenant 402-2 may be submitted concurrently with the request from tenant 402-1. The data requests can be processed concurrently. The requested data 420 may be migrated to a target database of tenant 402-2. The data migration may occur simultaneously from the source database 410-2 to tenant 402-1 and tenant 402-2.

The requested data may be distributed from the second source database 410-2 to another source database. For example, the requested data may be transmitted from the second source database 410-2 to a third, larger database 410-3. The third, larger source database 410-3 may have a larger enrollment (e.g., more tenants) than the second source database 410-2. The third, larger source database 410-3 may include the same source data from a plurality of tenants as the second source database 410-2 but may include additional source data from at least one tenant not included in the second database 410-2. In this example, the request for data may originate from the third source database 410-3 and request data from the second source database 410-2. The requested data may utilize the same data split and distribution methodology described in relation to FIG. 3.

Alternatively, the second database 410-2 and the third database 410-3 may be the same size but include source data from at least one of the same tenants from the plurality of tenants. For instance, the second source database 410-2 and the third source database 410-3 may include one shared tenant among a plurality of tenants.

A request for data may be received at the third source database 410-3 directly from a tenant storing data in the third source database 410-3. The process of splitting and distributing the requested data from the third source database 410-3 is similar to the process and methodology described in FIG. 3. The request for data may be received by a computing device of a tenant among the plurality of tenants storing data in the third database 410-3. The data request may be processed and distributed to the tenant that submitted the initial data request.

In an alternative embodiment, the first source database 410-1 may store data for a plurality of tenants in a training (e.g., non-production) environment. For example, the source data stored in the source database 410-1 may only be used for training of the application used to execute the methodology of data splitting and migration described in reference to FIG. 3. The vectors created to process requested data in the training (e.g., non-production) environment may be migrated 420 to a second source database 410-2. The second source database 410-2 may be an identical copy of the first source database including the vectorized data generated during the training period of the first source database 410-1.

The second source database 410-2 may process and store data for a plurality of tenants in a quality assurance/system integration testing (e.g., QA/SIT) environment. For example, the source data stored in the source database 410-2 may only be used for quality assurance or system integration testing of the application used to execute the methodology of data splitting and migration described in reference to FIG. 3. The vectors created to process requested data in the QA/SIT environment may be migrated 420 to a third source database 410-3. The third source database 410-3 may be an identical copy of the second source database including the vectorized data generated during the testing period of the second source database 410-2.

The third source database 410-3 may process and store data for a plurality of tenants in a production environment. For example, the source data stored in the source database 410-3 may be used during production of the application used to execute the methodology of data splitting and migration described in reference to FIG. 3. The production environment may be equivalent to the environment in which the application is accessible and utilized by tenants among the plurality of tenants storing data in the source database 410-3. The third source database 410-3 may be an identical copy of the second source database including the vectorized data generated during the testing period of the second source database 410-2.

Figure 5:
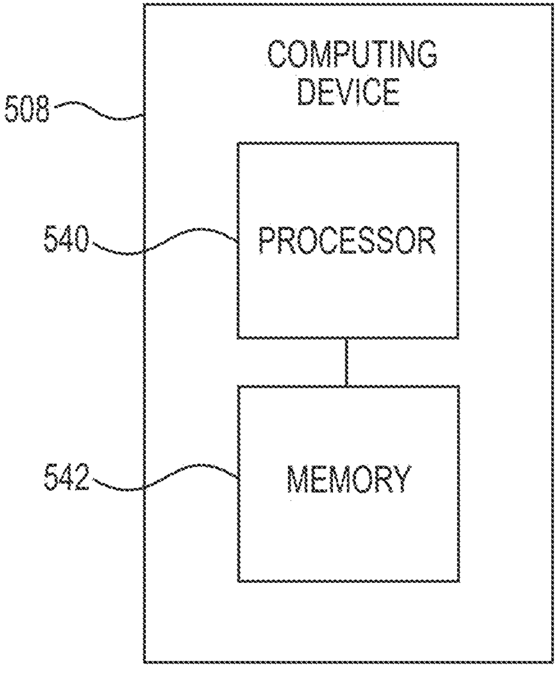
FIG. 5 is an example of a computing device for data management in a multi-tenant environment in accordance with one or more embodiments.

FIG. 5 is an example of a computing device 508 for data management in a multi-tenant environment, in accordance with one or more embodiments of the present disclosure. Computing device 508 can be, for example, a computing device 108 previously described in connection with FIG. 1. As illustrated in FIG. 5, the computing device 508 can include a memory 542 and a processor 540 for data management in a multi-tenant environment, in accordance with the present disclosure.

The memory 542 can be any type of storage medium that can be accessed by the processor 540 to perform various examples of the present disclosure. For example, the memory 542 can be a non-transitory computer readable medium having computer readable instructions (e.g., executable instructions/computer program instructions) stored thereon that are executable by the processor 540 for data management in a multi-tenant environment in accordance with the present disclosure.

The memory 542 can be volatile or nonvolatile memory. The memory 542 can also be removable (e.g., portable) memory, or non-removable (e.g., internal) memory. For example, the memory 542 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 542 is illustrated as being located within computing device 508, embodiments of the present disclosure are not so limited. For example, memory 542 can also be located internal to another computing resource (e.g., enabling computer readable instructions to be downloaded over the Internet or another wired or wireless connection).

The processor 540 may be a central processing unit (CPU), a semiconductor-based microprocessor, and/or other hardware devices suitable for retrieval and execution of machine-readable instructions stored in the memory 542.

The computing device 508 can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that device. Further, while a single computing device is illustrated, the term “computing device” shall also be taken to include any collection of computing devices that individually or jointly execute a set (or multiple sets) of instructions to perform any one or more of the methodologies discussed herein.

In alternative embodiments, the computing device 508 can be connected (e.g., networked) to other computing devices in a LAN, an intranet, an extranet, and/or the Internet. The computing device can operate in the capacity of a server or a client device in client-server network environment, as a peer device in a peer-to-peer (or distributed) network environment, or as a server or a client device in a cloud computing infrastructure or environment.

The computing device may store an application in memory 542 configured to perform the data management method described in reference to FIG. 3. The processor 540 may be configured to retrieve and execute instructions associated with the application stored in memory 542.

Figure 6:
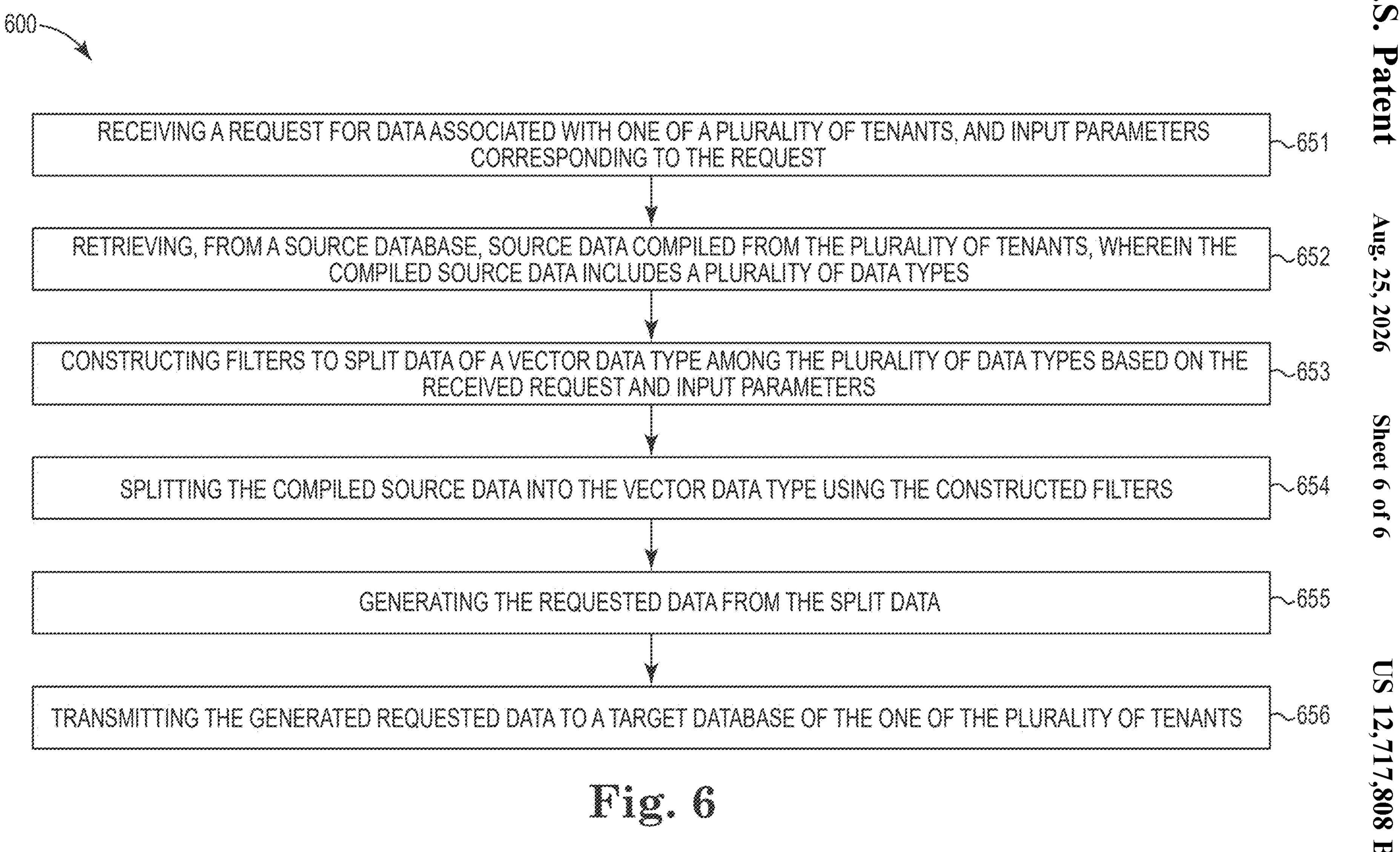
FIG. 6 illustrates a flow diagram of a method of data management in a multi-tenant environment in accordance with one or more embodiments.

FIG. 6 illustrates a flow diagram of a method 600 of data management in a multi-tenant environment in accordance with one or more embodiments. Although the method is 600 is illustrated in a particular sequence, embodiments are not limited as such and operations can be performed in varying order unless stated otherwise. Some or all portions of the method can be performed by, for example, computing device 508 of the multi-tenant environment, previously described in connection with FIG. 5.

At block 651, the method includes receiving a request for data associated with one of a plurality of tenants, and input parameters corresponding to the request. The input parameters may be received simultaneously with the request for data. The input parameters may provide details further describing the data requested.

At block 652, the method includes retrieving, from a source database, source data compiled from the plurality of tenants, wherein the compiled source data includes a plurality of data types. The source data may be retrieved according to the input parameters defining the request for data. The source data may include vectorized data and normal table data, and may be stored according to data type, for example. The source data may be vectorized according to the input parameters received, as an alternative example.

At block 653, the method includes constructing filters to split data of a vector data type among the plurality of data types based on the received request and input parameters. Filters can be constructed to split the requested source data of a vector data type from other source data included in the source database.

At block 654, the method includes splitting the compiled source data into the vector data type using the constructed filters. The source data can be split according to the constructed filters to separate the requested data from the source data in the source database.

At block 655, the method includes generating the requested data from the split data. The requested data may be generated as a copy of the source data. The source data may be split to generate the requested data as an output and a copy of the resulting requested data may be made.

At block 656, the method includes transmitting the generated requested data to a target database of the one of the plurality of tenants. The requested data may be migrated from the source database to a target database that is accessible by each of the plurality of tenants.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
- receiving, by a computing device, a request for data associated with one of a plurality of tenants, and input parameters corresponding to the request;
- retrieving, from a source database, source data compiled from the plurality of tenants, wherein the compiled source data includes a plurality of data types;
- processing, by the computing device, tags associated with data of a vector data type stored in a memory to identify at least tenant, product, or custom-field associations;
- dynamically constructing, by the computing device, filters to split data of a vector data type among the plurality of data types at a data level based on at least the tags associated with the data, the received request, and input parameters;
- splitting, by the computing device, the compiled source data into the vector data type using the constructed filters, including removing vector data not associated with the identified tags to generate tenant-specific split vector data, wherein the constructed filters comprise data-type-specific rules for preparing the vector data for transfer;
- generating, by the computing device, the requested data from the split data; and
- transmitting, by the computing device, the generated requested data to a target database of the one of the plurality of tenants.

2. The method of claim 1, wherein the method includes defining, by the computing device, a mapping between the plurality of data types of the compiled source data and a plurality of data types of the target database.

3. The method of claim 1, wherein transmitting the generated requested data to the target database includes:
- reading the requested data from the source database;
- writing the requested data to a temporary location within the target database; and
- transferring the requested data from the temporary location to a final location within the target database.

4. The method of claim 1, wherein transmitting the generated requested data to the target database includes inserting the requested data into a target data table within the target database by creating or altering a column in the target data table.

5. The method of claim 1, wherein the input parameters correspond to conditions set by the one of the plurality of tenants.

6. The method of claim 1, wherein the method includes:
- generating a message responsive to the transmission of the generated requested data to the target database; and
- transmitting the generated message to a computing device of the one of the plurality of tenants.

7. The method of claim 1, wherein the compiled source data from the plurality of tenants is stored according to data type among the plurality of data types.

8. A non-transitory computer readable medium storing instructions executable by a processing resource that when executed, cause the processing resource to:
- retrieve, from a source database, source data compiled from a plurality of tenants, wherein the compiled source data includes a plurality of data types, in response to receiving a request for data;
- process tags associated with data of a vector data type stored in a memory to identify at least tenant, product, or custom-field associations;
- dynamically construct filters to split data of a vector data type among the plurality of data types at a data level based on at least the tags associated with the data, the received request for data, and input parameters;
- split the compiled source data into the vector data type using the constructed filters, including removing vector data not associated with the identified tags to generate tenant-specific split vector data, wherein the constructed filters comprise data-type-specific rules for preparing the vector data for transfer;
- generate the requested data from the split data and the compiled source data of another data type among the plurality of data types; and
- transmit the generated requested data to a target database of one of the plurality of tenants.

9. The non-transitory computer readable medium of claim 8, wherein the requested data includes data of both a standard data type and the vector data type.

10. The non-transitory computer readable medium of claim 8, wherein the data of the vector data type includes collections and embeddings of vectorized data.

11. The non-transitory computer readable medium of claim 8, further comprising instructions to generate a copy of the requested data prior to transmitting the generated requested data to the target database.

12. The non-transitory computer readable medium of claim 8, wherein a portion of the source database is configured to store data of a first data type and a separate portion of the source database is configured to store data of a second data type.

13. The non-transitory computer readable medium of claim 8, wherein constructing filters to split data of a vector data type includes assigning custom tags to data of the vector data type.

14. The non-transitory computer readable medium of claim 8, wherein the source database is a PostgreSQL database.

15. The non-transitory computer readable medium of claim 8, further comprising instructions to process a number of requests for data concurrently.

16. A computing device for data management in a multi-tenant environment, comprising:
- a processing resource; and
- a memory resource storing non-transitory machine-readable instructions that when executed, cause the processing resource to:
  - receive a request for data associated with one of a plurality of tenants, and input parameters corresponding to the request;
  - retrieve, from a source database, source data compiled from the plurality of tenants, wherein the compiled source data includes a plurality of data types;

process tags associated with data of a vector data type stored in a memory to identify at least tenant, product, or custom-field associations;

dynamically construct filters to split data of a vector data type among the plurality of data types at a data level based on at least the tags associated with the data, the received request, and input parameters;

split the compiled source data into the vector data type using the constructed filters, including removing vector data not associated with the identified tags to generate tenant-specific split vector data, wherein the constructed filters comprise data-type-specific rules for preparing the vector data for transfer;

generate the requested data from the split data and the compiled source data of another data type among the plurality of data types; and transmit the generated requested data to a target database of the one of the plurality of tenants.

17. The computing device of claim 16, including instructions to cause the processing resource to transmit a message in response to the generated requested data being transmitted to the target database.

18. The computing device of claim 16, wherein the generated requested data includes data of a number of data types among the plurality of data types.

19. The computing device of claim 16, wherein transmitting the generated requested data to the target database includes transmitting data of a number of data types to a corresponding location within the target database.

20. The computing device of claim 16, wherein the input parameters define the requested data.

* * * * *